US008624922B2

(12) United States Patent
Sukenori

(10) Patent No.: US 8,624,922 B2
(45) Date of Patent: Jan. 7, 2014

(54) IMAGE COMPOSITION APPARATUS, AND STORAGE MEDIUM WITH PROGRAM STORED THEREIN

(75) Inventor: Atsushi Sukenori, Higashiyamato (JP)

(73) Assignee: Casio Computer Co., Ltd., Tokyo (JP)

(*) Notice: Subject to any disclaimer, the term of this patent is extended or adjusted under 35 U.S.C. 154(b) by 421 days.

(21) Appl. No.: 13/115,329

(22) Filed: May 25, 2011

(65) Prior Publication Data

US 2011/0292075 A1 Dec. 1, 2011

(30) Foreign Application Priority Data

May 31, 2010 (JP) ................................. 2010-124995

(51) Int. Cl.
*G09G 5/00* (2006.01)
(52) U.S. Cl.
USPC .......................................... 345/629; 345/600
(58) Field of Classification Search
USPC ................................................. 345/600, 629
See application file for complete search history.

(56) References Cited

U.S. PATENT DOCUMENTS 6,987,535 B1 1/2006 Matsugu et al.

FOREIGN PATENT DOCUMENTS

| CN | 101527049 A | 9/2009 |
|---|---|---|
| CN | 101587593 A | 11/2009 |
| JP | 2000-209425 A | 7/2000 |
| JP | 2004-7770 A | 1/2004 |
| JP | 2006-185017 A | 7/2006 |

OTHER PUBLICATIONS

Japanese Office Action dated Feb. 21, 2012 (and English translation thereof) in counterpart Japanese Application No. 2010-124995.
Chinese Office Action dated Mar. 26, 2013 (and English translation thereof) in counterpart Chinese Application No. 201110157491.7.
Xu Wen-hua et al.: "Learning of image rendering style based on texture synthesis": Engineering Journal of Wuhan University: vol. 36, No. 3: Jun. 30, 2003: pp. 115-119 (with English language Abstract).

*Primary Examiner* — Maurice L McDowell, Jr.
(74) *Attorney, Agent, or Firm* — Holtz, Holtz, Goodman & Chick, PC

(57) ABSTRACT

There is provided an image composition apparatus configured to produce a composite image in which a foreground image is overlaid on a part of a background image. The apparatus designates a pair of images used as the background image and the foreground image, when one image of the pair of images is a pictorial image with a certain pictorial style, obtains pictorial style information indicative of the pictorial style of the one image of the pair of images, converts the other image of the pair of images into a pictorial image with the pictorial style indicated by the pictorial style information, produces a composite image from a combination of the pictorial image corresponding to the one image of the pair of images and the pictorial image resulting from the conversion on the other image of the pair of images, and outputs the composite image.

5 Claims, 8 Drawing Sheets

G1

G2

G3

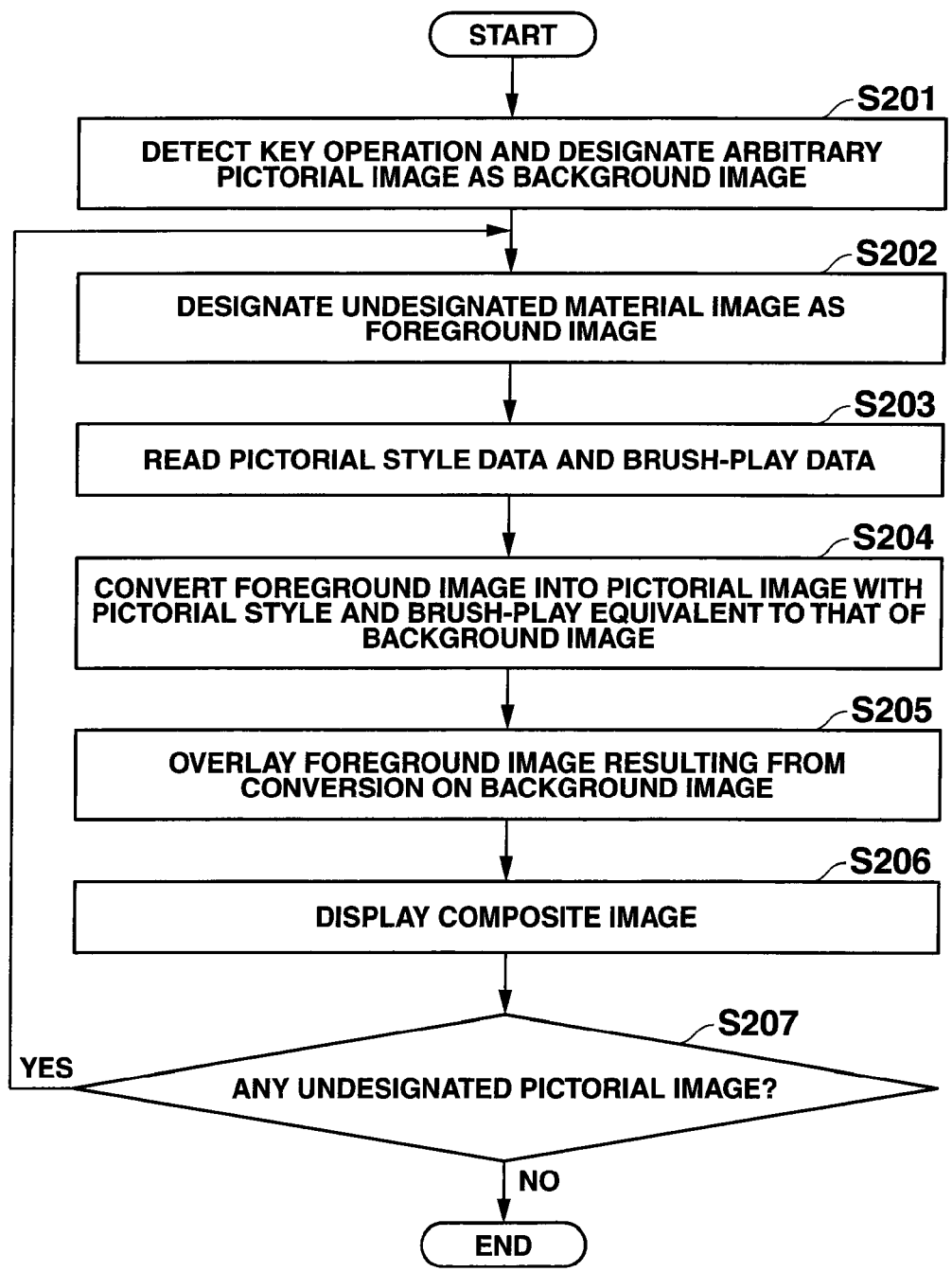

IMAGE COMPOSITION APPARATUS, AND STORAGE MEDIUM WITH PROGRAM STORED THEREIN

CROSS-REFERENCE TO RELATED APPLICATIONS

This application is based upon and claims the benefit of priority from prior Japanese Patent Application No. 2010-124995, filed May 31, 2010, the entire contents of which are incorporated herein by reference.

BACKGROUND OF THE INVENTION

1. Field of the Invention

The present invention relates to an image composition technique for overlaying, on a part of an image serving as a background, another image serving as a foreground.

2. Description of the Related Art

For example, Jpn. Pat. Appln. KOKAI Publication No. 2000-209425 (hereinafter referred to as Patent Document 1) describes a conventional image composition technique used when, on a part of an image serving as a background (hereinafter referred to as a background image), another image serving as a foreground (hereinafter referred to as a foreground image) is overlaid to produce a new image. In this technique, the gradation and style of the foreground image are adjusted so as to reduce differences in gradation and style between the background image and the foreground image. Using the image composition technique described in Patent Document 1 provides a more natural composite image that prevents a viewer from feeling the image odd even if for example, images taken with a digital camera under different image taking conditions and recorded as image data are used as a background image and a foreground image.

However, the image composition technique described in Patent Document 1 cannot deal with the following case. For example, whereas the foreground image is an image taken with a camera, the background image is a pictorial image obtained by subjecting a camera-taken image to an image conversion process so that the image offers a pictorial style that is a visual characteristic similar to that of pictures of a particular type (Japanese painting, Western painting, or the like). That is, disadvantageously, a natural composite image cannot be obtained even when the gradation and style of the foreground image are adjusted in accordance with the gradation and style of the background image.

In view of the above-described circumstances, an image composition technique is desired to be presented by which a foreground image is overlaid on a part of a background image to form a more natural composite image that prevents the viewer from feeling the image odd even if one of the foreground image and the background image is a pictorial image.

BRIEF SUMMARY OF THE INVENTION

According to one aspect of the present invention, there is provided an image composition apparatus configured to produce a composite image in which a foreground image is overlaid on a part of a background image, the apparatus comprising: an image designation unit configured to designate a pair of images used as the background image and the foreground image; an information obtaining unit configured to, when one image of the pair of images is a pictorial image with a certain pictorial style, obtain pictorial style information indicative of the pictorial style of the one image of the pair of images; an image conversion unit configured to convert the other image of the pair of images into a pictorial image with the pictorial style indicated by the pictorial style information obtained by the information obtaining unit; a composition unit configured to produce a composite image from a combination of the pictorial image corresponding to the one image of the pair of images and the pictorial image resulting from the conversion by the image conversion unit of the other image of the pair of images; and an output unit configured to output the composite image produced by the composition unit.

According to another aspect of the present invention, there is provided a non-transitory computer-readable storage medium having program code stored thereon for controlling an image composition apparatus configured to produce a composite image in which a foreground image is overlaid on a part of a background image, the program code comprising: designating a pair of images used as the background image and the foreground image; obtaining, when one image of the pair of images is a pictorial image with a certain pictorial style, pictorial style information indicative of the pictorial style of the one image of the pair of images; converting the other image of the pair of images into a pictorial image with the pictorial style indicated by the pictorial style information; and producing a composite image from a combination of the pictorial image corresponding to the one image of the pair of images and the pictorial image resulting from the conversion of the other image of the pair of images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a flowchart illustrating a procedure for the CPU in the composite display mode according to the second embodiment.

DETAILED DESCRIPTION OF THE INVENTION

Embodiments of the present invention will be described below. The embodiments described below relate to a digital photoframe (DPF) providing a function to display various images recorded as image data and an image composition function to overlay, on a part of an image serving as a background, another image serving as a foreground.

(First Embodiment)

Figure 1:
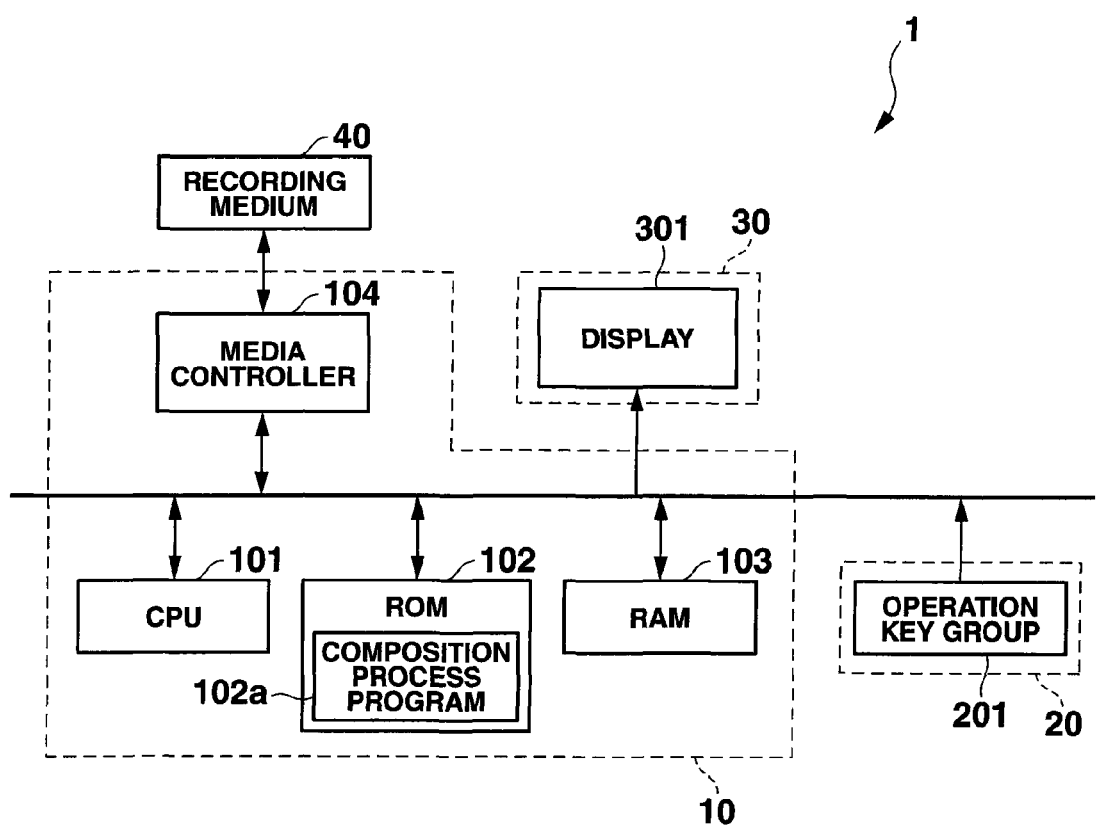
FIG. 1 is a schematic block diagram illustrating the hardware configuration of a digital photoframe common to embodiments according to the present invention.

First, a first embodiment will be described. FIG. 1 is a schematic block diagram illustrating the hardware configuration of a DPF 1 common to the embodiments to which the present invention is applied. The DPF 1 is configured such that the whole system is controlled by a central processing unit (CPU) 101. The CPU 101 connects to a read-only memory (ROM) 102, random access memory (RAM) 103, a media controller 104, an operation key group 201, and a display 301.

The ROM 102 is a memory configured to store plural types of programs and data used to allow the whole system to be controlled. The programs stored in the ROM 102 include a composition process program (program code) 102a for allowing the CPU 101 to execute an image designation process, an information obtaining process, an image conversion process, and an image composition process.

The RAM 103 is a work memory in which the CPU 101 temporarily stores various data as required in order to control the DPF 1. Specifically, the RAM 103 is a synchronous dynamic random-access memory (SDRAM) or the like.

The media controller 104 is an I/O interface configured to control data inputs and outputs between the CPU 101 and a recording medium 40 removably installed in a memory card slot provided in the main body of the DPF 1.

The recording medium 40 is a nonvolatile card-shaped storage medium including a flash memory. Plural types of image data are stored in the recording medium 40.

Image data taken with a digital camera or the like is stored in the recording medium 40. An image taken with a digital camera or the like is hereinafter referred to as a camera-taken image. Image data expressing the camera-taken image is hereinafter referred to as camera-taken image data. The camera-taken image data is stored as a still image file after the image data is compressed according to the Joint Photographic Expert Group (JPEG) scheme, with additional information such as an image taking date and time added to the compressed image data.

Furthermore, the recording medium 40 is configured to store image data expressing pictorial images newly produced by executing an art conversion process on camera-taken image data. The art conversion process is an image conversion process for imposing on a camera-taken image various styles. Image data expressing a pictorial image is hereinafter referred to as pictorial image data.

Like the camera-taken image data, the pictorial image data is stored as a still image file after the image data is compressed according to the Joint Photographic Expert Group (JPEG) scheme, with additional information such as the image taking date and time added to the compressed image data.

Furthermore, in the still image file with the pictorial image data stored therein, pictorial style data and brush-play data are stored in a file header area in which the additional information is stored. The pictorial style data is indicative of the style of a pictorial image. The brush-play data is indicative of the nature of brush-play expressed in the pictorial image.

Here, the pictorial style is a pictorial characteristic specified based on an impression that a user has when viewing the image. The pictorial style can be classified into various categories such as Japanese painting, Western painting, watercolor painting, ink painting, pen-and-ink drawing, and van Gogh. Furthermore, the brush-play is the thickness and form of a brushstroke expressed in the pictorial image and is a characteristic recognized as the delicacy of brushstrokes. Thus, even when viewing pictorial images with the same pictorial style, the user has different impressions if the images are different in brush-play.

The recording medium 40 is also configured to store image data expressing image elements each pre-created in order to be overlaid on a part of an arbitrary image serving as a background image. Image data expressing image elements is hereinafter referred to as image element data.

The image element is obtained by cutting out a part of a camera-taken image using an arbitrary apparatus. Furthermore, in the image element data, for example, not only color information such as red, green, and blue (RGB) but also transparency information ($\alpha$ channel or the like) is assigned to each pixel. Additionally, an area of the cutout part of the camera-taken image or the like which area corresponds to a background is in a transparent color.

The operation key group 201 includes a power switch and a plurality of operation switches. The CPU 101 regularly scans the operation status of operation keys in the operation key group 201 to detect various instructions given by the user via predetermined key operations.

The display 301 includes a color liquid crystal display panel with a backlight, and a driving circuit configured to drive a color liquid crystal display panel in accordance with display data such as image data supplied by the CPU 101 to allow the color liquid crystal display panel to display images or the like expressed by the image data.

Figure 2:
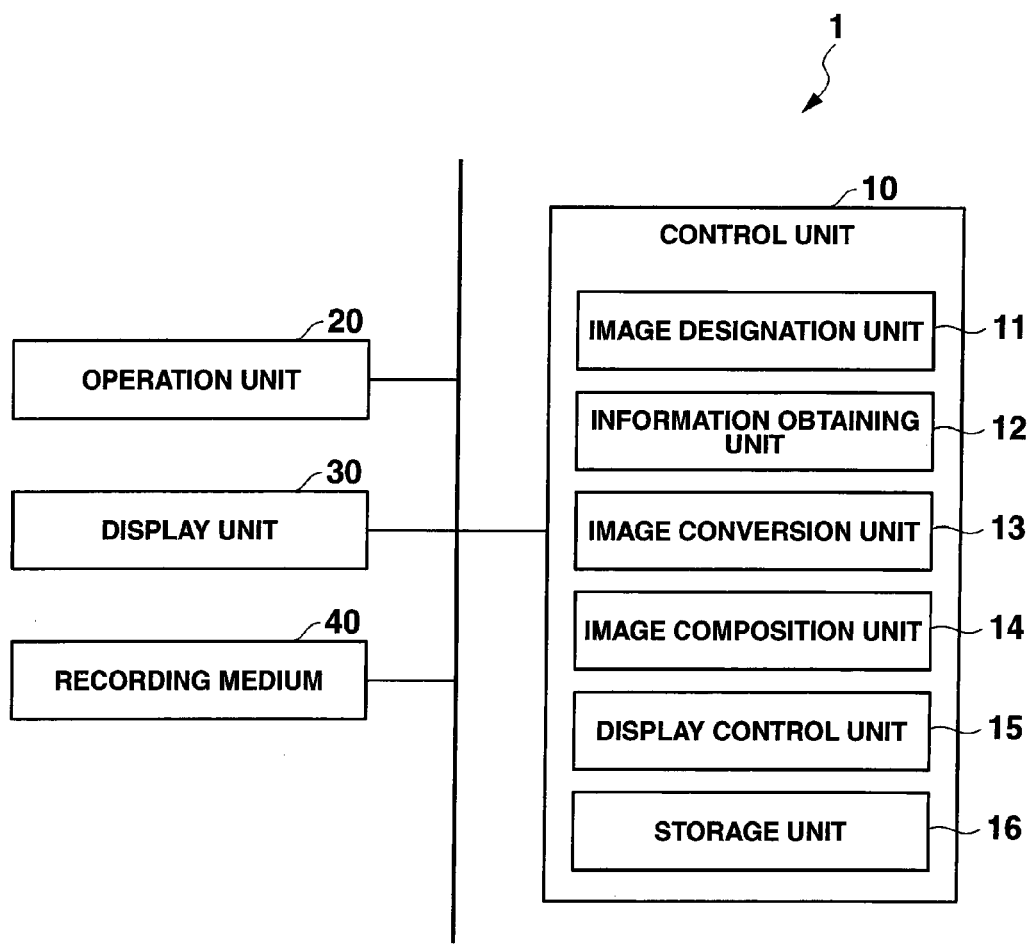
FIG. 2 is a functional block diagram illustrating essential functions of the digital photoframe according to a first embodiment.

FIG. 2 is a functional block diagram illustrating essential functions of the DPF 1. The DPF 1 includes a control unit 10, an operation unit 20, and a display unit 30. The control unit 10 includes an image designation unit 11, an information obtaining unit 12, an image conversion unit 13, an image composition unit 14, a display control unit 15, and a storage unit 16.

The operation unit 20 is functional section that detects the user's various instructions intended for the DPF 1. The operation unit 20 is implemented by the operation key group 201 illustrated in FIG. 1.

The display unit 30 displays the camera-taken images expressed by the camera-taken image data recorded in the recording medium 40 and images expressed by another image data. The display unit 30 further displays various operation screens required for the user to operate the DPF 1. The display unit 30 is implemented by a display 301 illustrated in FIG. 1.

The image designation unit 11 designates a camera-taken image or a pictorial image to be used as a background image and an image element to be used as a foreground image in response to the user's instruction detected by the operation unit 20; the camera-taken image or pictorial image and the image element are selected from the images stored in the recording medium 40 as image data. The image designation unit 11 is implemented by the CPU 101 illustrated in FIG. 1.

The information obtaining unit 12 operates when the image designation unit 11 designates an arbitrary pictorial image as a background image, to obtain pictorial style data and brush-play data added to the pictorial image data expressing the pictorial image designated as the background image. The information obtaining unit 12 supplies the pictorial style data and brush-play data to the image conversion unit 13. The information obtaining unit 12 is also implemented by the CPU 101 illustrated in FIG. 1.

The image conversion unit 13 executes, on arbitrary image element data stored in the recording medium 40, an art conversion process whose nature corresponds to the pictorial style data and brush-play data supplied by the information obtaining unit. The art conversion process executed on the image element data by the image conversion unit 13 uses a brush-play equivalent to that in the pictorial image designated as the background image by the image designation unit 11, to obtain a pictorial style equivalent to that of the pictorial image designated as the background image by the image designation unit 11. The image conversion unit 13 is also implemented by the CPU 101 illustrated in FIG. 1.

The art conversion process executed by the image conversion unit 13 is an application of the techniques described in, for example, Jpn. Pat. Appln. KOKAI Publication No. 10-011569 and Jpn. Pat. Appln. KOKAI Publication No. 2006-031688. Specifically, strongly correlated pixels are collected from the pixels forming the image data based on colors or the like. The collected pixels are then grouped. Then, for the pixels in each group, the colors of the pixels in the same group are replaced with a representative color for the group.

In such a process, the image expressed by the processed image data can be provided with various image styles by varying the manner of correlating the grouped pixels with one another and the basic shape of the group formed of the pixels in the same color (representative color).

Furthermore, even though the same pictorial style is provided for the processed image data, differences in brush-play can be expressed by varying the length (distance) or flatness of the group formed of the pixels in the same color (representative color).

Figure 3:
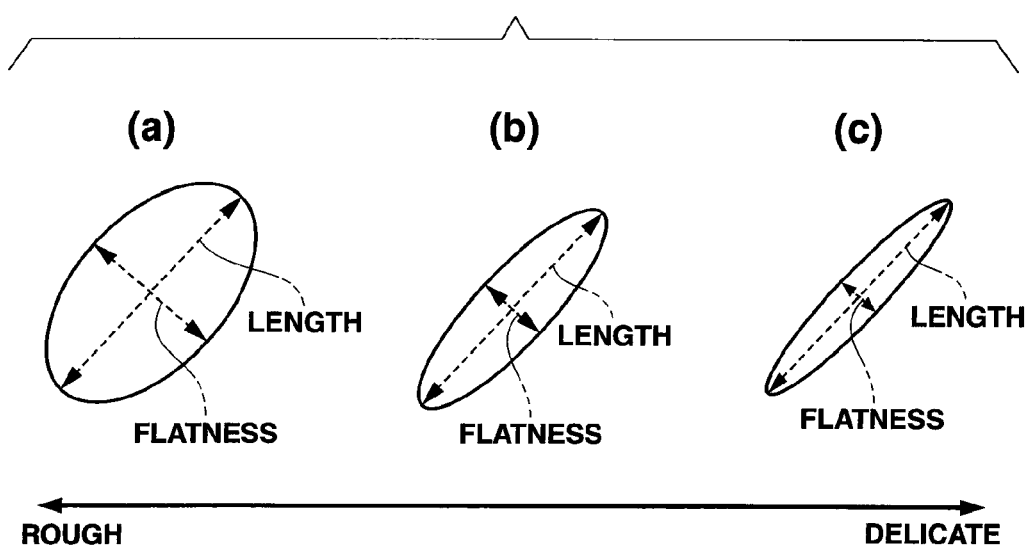
FIG. 3 is a diagram illustrating the relationship between the flatness of a group including pixels in the same color which are used for an art conversion process and the thickness of a paint brush reflected in a pictorial image.

For example, as illustrated in FIG. 3, the thickness of a brush expressed in the image (pictorial image) expressed by the processed image data can be varied by varying only the flatness of the group formed of the pixels in the same color without varying the basic shape of the group. That is, as illustrated in (a) of FIG. 3, when the flatness of the group formed of the pixels in the same color is increased, the brush is thickened, allowing rough brush-play to be expressed in the image. Furthermore, as illustrated in (b) and (c) of FIG. 3, the thickness of the brush decreases consistently with the flatness of the group. The thinner brush allows more delicate brush-play to be expressed in the image.

In the present embodiment, the optimum combination of parameters such as the degree of correlation among the pixels forming the same group used for the art conversion process and the basic shape of the group is set for each of the plurality of image styles. The optimum combinations of parameters for the respective tones of image are described in the composition process program 102a stored in the ROM 102. Furthermore, parameters such as the length (distance) and flatness of the group formed of the pixels in the same color (representative color) are set for each aspect (the delicacy of brushstrokes) of the brush-play to be expressed. Additionally, the parameters corresponding to the nature of the brush-play also vary depending on the pictorial style. The parameters determining the nature of the brush-play are also described in the composition process program 102a stored in the ROM 102.

The image composition unit 14 overlays the image element data expressing the image element designated as the foreground image by the image designation unit 11 on the camera-taken image data expressing the camera-taken image designated as the background image by the image designation unit 11 to produce composite image data. Furthermore, the image composition unit 14 overlays the image element data with the art conversion process executed thereon by the image conversion unit 13 on the camera-taken image data expressing the pictorial image designated as the background image by the image designation unit 11 to produce composite image data. The image composition unit 14 is also implemented by the CPU 101 illustrated in FIG. 1.

The display control unit 15 allows display unit 30 to display an image expressed by arbitrary image data recorded in the recording medium 40 and a composite image expressed by the composite image data produced by the image composition unit 14. The display unit 15 is also implemented by the CPU 101 illustrated in FIG. 1.

The storage unit 16 is configured to temporarily store various work data produced for the art conversion process by the image conversion unit 13 and data of various images that the display control unit 15 allows the display unit 30 to display. The storage unit 16 is implemented by the RAM 103 illustrated in FIG. 1.

Now, the operation of the DPF 1 configured as described above will be described. The DPF 1 is provided with a composite display mode serving as an operation mode that can be appropriately set by the user by operating a predetermined operation key in the operation key group 201. The composite display mode is an operation mode in which an arbitrary camera-taken image or pictorial image recorded in the recording medium 40 as image data is designated as a background image and in which an arbitrary image element recorded in the recording medium 40 as image data is overlaid on a part of the background image.

Figure 4:
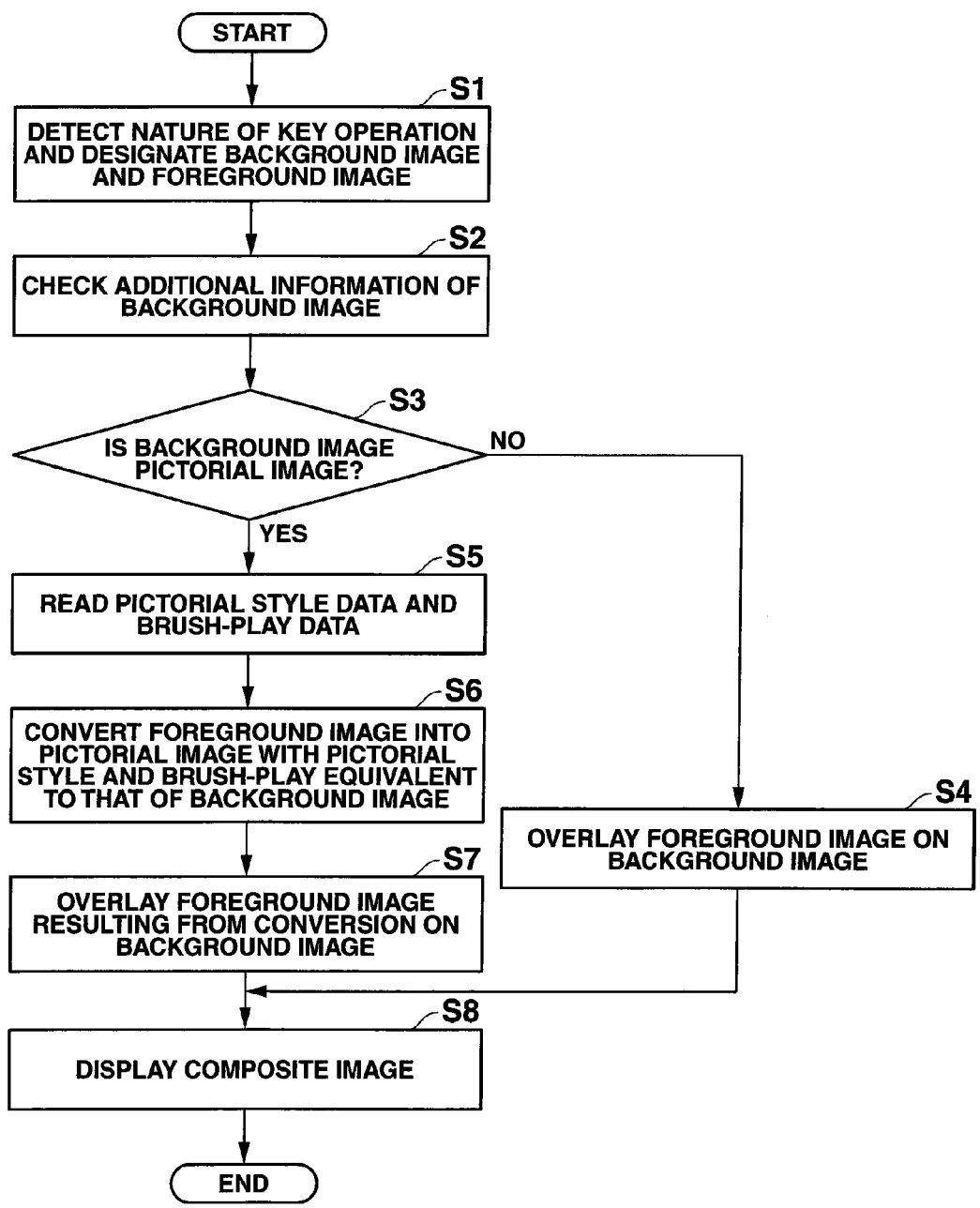
FIG. 4 is a flowchart illustrating a procedure for the CPU in a composite display mode according to the first embodiment.

The specific operation of the DPF 1 in the composite display mode will be described below. FIG. 4 is a flowchart illustrating a process executed by the control unit 10 (CPU 101) in the composite display mode in accordance with the composition process program 102a stored in the ROM 102.

In the composite display mode, first, the image designation unit 11 (CPU 101) sequentially detects the operation status of the operation keys and the like in the operation key group 201 to designate a background image and a foreground image to be compositely displayed (step S1).

In the processing in step S1, the image designation unit 11 reads image data of camera-taken images and pictorial images recorded in the recording medium 40. The image designation unit 11 then displays the images expressed by the read image data, in a list on a screen of the display unit 30 (display 301) as selection candidates. Then, the image designation unit 11 allows the user to select an image to be used as a background image, via a predetermined key operation. The image designation unit 11 stores the name of a file of the selected image in the storage unit 16 (RAM 103).

Moreover, the image designation unit 11 reads the image element data recorded in the recording medium 40. The image designation unit 11 displays the image elements expressed by the read image data, in a list on the screen of the display unit 30 (display 301) as selection candidates. Then, the image designation unit 11 allows the user to select an image to be used as a foreground image, via a predetermined key operation. The image designation unit 11 then stores the name of a file of the selected image element in the storage unit 16 (RAM 103).

Then, the control unit 10 checks the nature of additional information added to the image data designated as the background image. The control unit 10 thus determines whether or not the image data designated as the background image is pictorial image data (step S2). In the processing in step S2, the control unit 10 determines that the image data is pictorial image data if pictorial style data and brush-play data are added to the image data designated as the background image. Conversely, the control unit 10 determines that the image data is not pictorial image data if pictorial style data and brush-play data are not added to the image data designated as the background image.

If the control unit 10 determines that the image data is not pictorial image data (step S3: NO), the image composition unit 14 (CPU 101) overlays the foreground image (image element) on the background image (camera-taken image) (step S4). That is, the image composition unit 14 overlays the image data of the image element designated as the foreground image directly on the image data of the camera-taken image designated as the background image to produce composite image data (step S4).

Thereafter, the display control unit 15 (CPU 101) transmits the composite image data produced by the image composition unit 14 to the display unit 30. The display unit 30 displays a composite image in which the foreground image (image element) is overlaid on a part of the background image (camera-taken image) (step S8). Then, the control unit 10 ends the processing in the composite display mode.

On the other hand, if the control unit 10 determines that the image data is pictorial image data (step S3: YES), then first, the information obtaining unit 12 (CPU 101) reads and supplies the pictorial style and brush-play data added to the pictorial image data, to the image conversion unit 13 (CPU 101) (step S5).

Then, the image conversion unit 13 converts the foreground image (image element) into a pictorial image with a pictorial style and brush-play equivalent to that of the background image (pictorial image) (step S6). That is, the image conversion unit 13 subjects the image element data designated as the foreground image by the image designation unit 11, to an art conversion process using parameters corresponding to the pictorial style indicated by the supplied pictorial style data and the nature of brush-play indicated by the supplied brush-play data. The image conversion unit 13 thus converts the image element data into the pictorial image data.

Figure 5A:
FIG. 5A is a diagram illustrating an example of an image element not subjected to the art conversion process yet.
Figure 5B:
FIG. 5B is a diagram illustrating an example of an image element subjected to the art conversion process.

FIG. 5A is a diagram showing an example of an image element G1 expressed by image element data not subjected to the art conversion process yet. FIG. 5B is a diagram showing an example of an image element G2 expressed by image element data subjected to the art conversion process.

Subsequently, the image composition unit 14 overlays the foreground image corresponding to the pictorial image resulting from the conversion on the background image (step S7). That is, the image composition unit 14 overlays the pictorial image data resulting from the conversion of the image element data on the image data of the pictorial image designated as the background image to produce composite image data.

Thereafter, the display control unit 15 transmits the composite image data produced by the image composition unit 14 to the display unit 30. The display unit 30 displays a composite image in which, on a part of the background image (pictorial image), the foreground image (another pictorial image) with a pictorial style and brush-play equivalent to that of the foreground image is overlaid (step S8). Then, the control unit 10 ends the processing in the composite display mode.

Figure 5C:
FIG. 5C is a diagram illustrating an example of a composite image.

FIG. 5C is a diagram showing an example of a composite image G3 obtained when the foreground image is the image element G2 illustrated in FIG. 5B.

The control unit 10 executes the above-described process to allow the DPF 1 to operate as follows in the composite display mode. That is, the DPF 1 sets an arbitrary camera-taken image or pictorial image specified by the user as a background image, and overlays an arbitrary image element specified by the user on a part of the background image as a foreground image.

Here, if the image selected as the background image by the user is a pictorial image, the DPF 1 temporarily converts the image element selected as the foreground image by the user into a pictorial image with a pictorial style equivalent to that of the pictorial image serving as the background image, and then overlays the pictorial image resulting from the conversion on the pictorial image serving as the background image.

Thus, in the finally displayed composite image, the foreground image portion blends in with the background image. That is, the foreground image and the background image can be made visually continuous. Thus, even if the user selects a pictorial image as the background image, a more natural image preventing the user from feeling the image odd can be obtained as a composite image in which the foreground image is overlaid on a part of the background image.

Furthermore, in the first embodiment, if the background image is a pictorial image, the image element serving as the foreground image is converted into a pictorial image with not only a pictorial style equivalent to that of the pictorial image serving as the background image but also brush-play equivalent to that of the pictorial image serving as the background image. Thus, in the finally displayed composite image, the foreground image and the background image can be made more visually continuous. Hence, a much more natural image preventing the user from feeling the image odd can be obtained as a composite image in which the foreground image is overlaid on a part of the background image.

(Modification and the Like of the First Embodiment)

In the description of the first embodiment, it is assumed that the image element used as the foreground image is obtained by allowing an arbitrary apparatus to cut out a part of a camera-taken image. However, in the present invention, the image element used as the foreground image may be an image obtained by cutting off a part of a pictorial image with a certain pictorial style or a pictorial image with a certain pictorial style resulting from pre-conversion. Thus, the DPF 1 may be configured such that for example, the control unit 10 executes the following process as an operation in the composite display mode.

That is, the control unit 10 checks both the image designated as the background image during the processing in step S2 and the image element designated as the foreground image, for additional information. Then, if only the image designated as the background image is a pictorial image, the control unit 10 executes the above-described processing in steps S5 to S8.

Furthermore, if neither the image designated as the background image nor the image element designated as the foreground image is a pictorial image and if both the image designated as the background image and the image element designated as the foreground image are pictorial images, the control unit 10 (image composition unit 14) executes the processing in step S4 to overlay the image element designated as the foreground image on the image designated as the background image.

Additionally, if only the image designated as the foreground image is a pictorial image, the control unit 10 (image conversion unit 13) temporarily converts the camera-taken image serving as the background image into a pictorial image with a pictorial style and brush-play equivalent to that of the pictorial image serving as the foreground image. Then, the control unit 10 (image composition unit 14) overlays the image element designated as the foreground image on the background image corresponding to the pictorial image resulting from the conversion. The DPF 1 may adopt the above-described configuration.

When the DPF 1 adopts the configuration in which the control unit 10 executes the above-described process, even if only the image element used as the foreground image is a pictorial image, the foreground image portion blends in with the background image. Thus, even if only the image element used as the foreground image is a pictorial image, a more natural image preventing the user from feeling the image odd can be obtained as a composite image.

(Second Embodiment)

Now, a second embodiment of the present invention will be described. The second embodiment relates to another DPF having the same configuration as the DPF 1 illustrated in FIG. 1; however, in the DPF in the second embodiment, a composition process program 102*a* stored in the ROM 102 allows the CPU 101 to execute an image designation process, an information obtaining process, an image conversion process, an image composition process, and an image designation control process.

Figure 6:
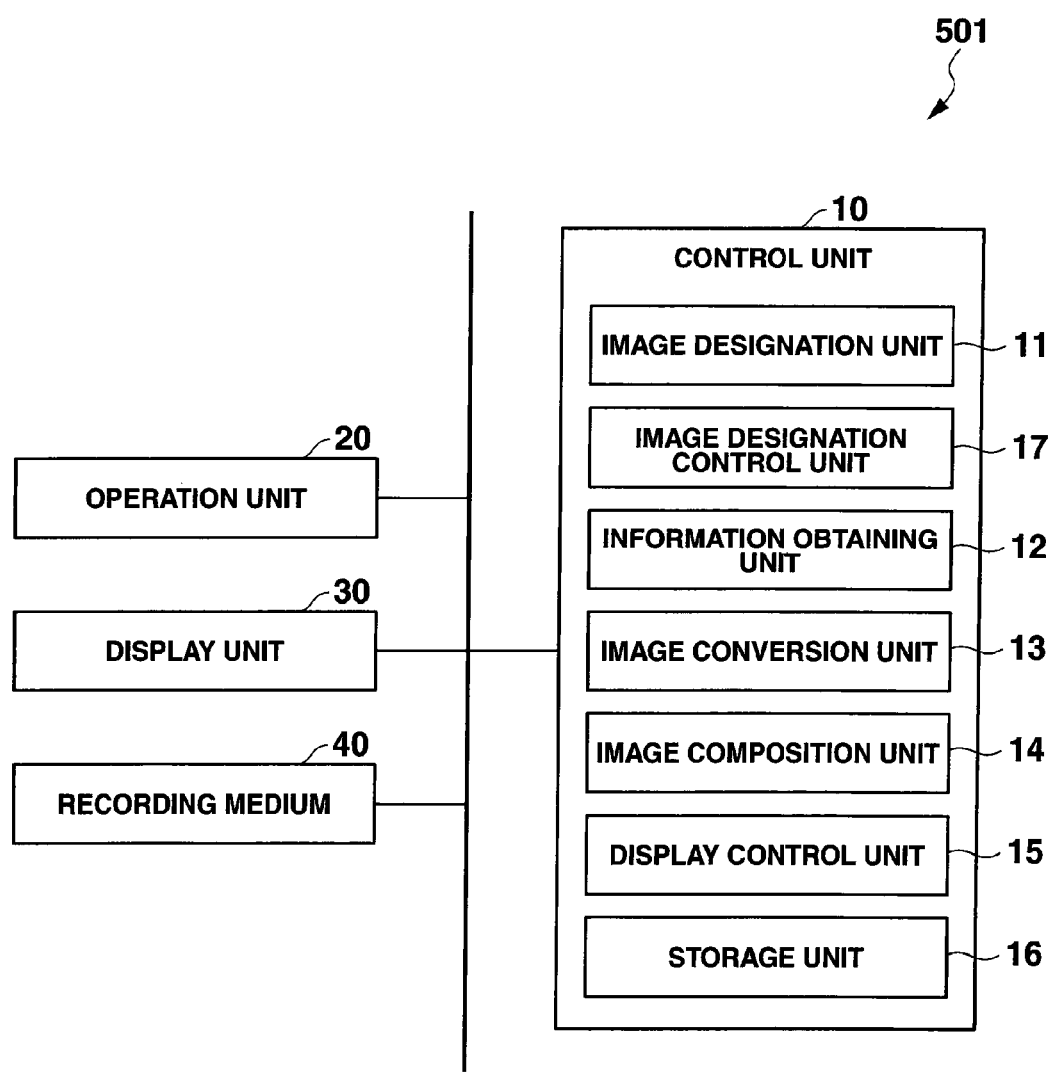
FIG. 6 is a functional block diagram illustrating essential functions of a digital photoframe common to a second embodiment and a third embodiment.

FIG. 6 is a functional block diagram illustrating essential functions of the DPF 501 according to the second embodiment. The DPF 501 includes a control unit 10, an operation unit 20, and a display unit 30. The control unit 10 includes an image designation unit 11, an image designation control unit 17, an information obtaining unit 12, an image conversion unit 13, an image composition unit 14, a display control unit 15, and a storage unit 16.

In the second embodiment, in a composite display mode described below, the image designation unit 11 designates an arbitrary image element stored in a recording medium 40 as image data, as a foreground image in response to the user's instruction. Furthermore, in the composite display mode described below, the image designation unit 11 designates, as the foreground image, each one of a plurality of images stored in the recording medium 40 as image data which image is specified by the image designation unit 17.

In the composite display mode described below, the image designation control unit 17 allows the image designation unit 11 to designate each one of a plurality of pictorial images stored in the recording medium 40 as image data, as a background image in order, with a sole image element remaining designated as the foreground image. The image designation control unit 17 is implemented by the CPU 101 illustrated in FIG. 1.

The components of the second embodiment other than the image designation unit 11 and the image designation control unit 17 are the same as the corresponding components of the first embodiment. Thus, the same components of the second embodiment as those illustrated in FIG. 2 are denoted by the same reference numbers and will not be described below.

Figure 7:
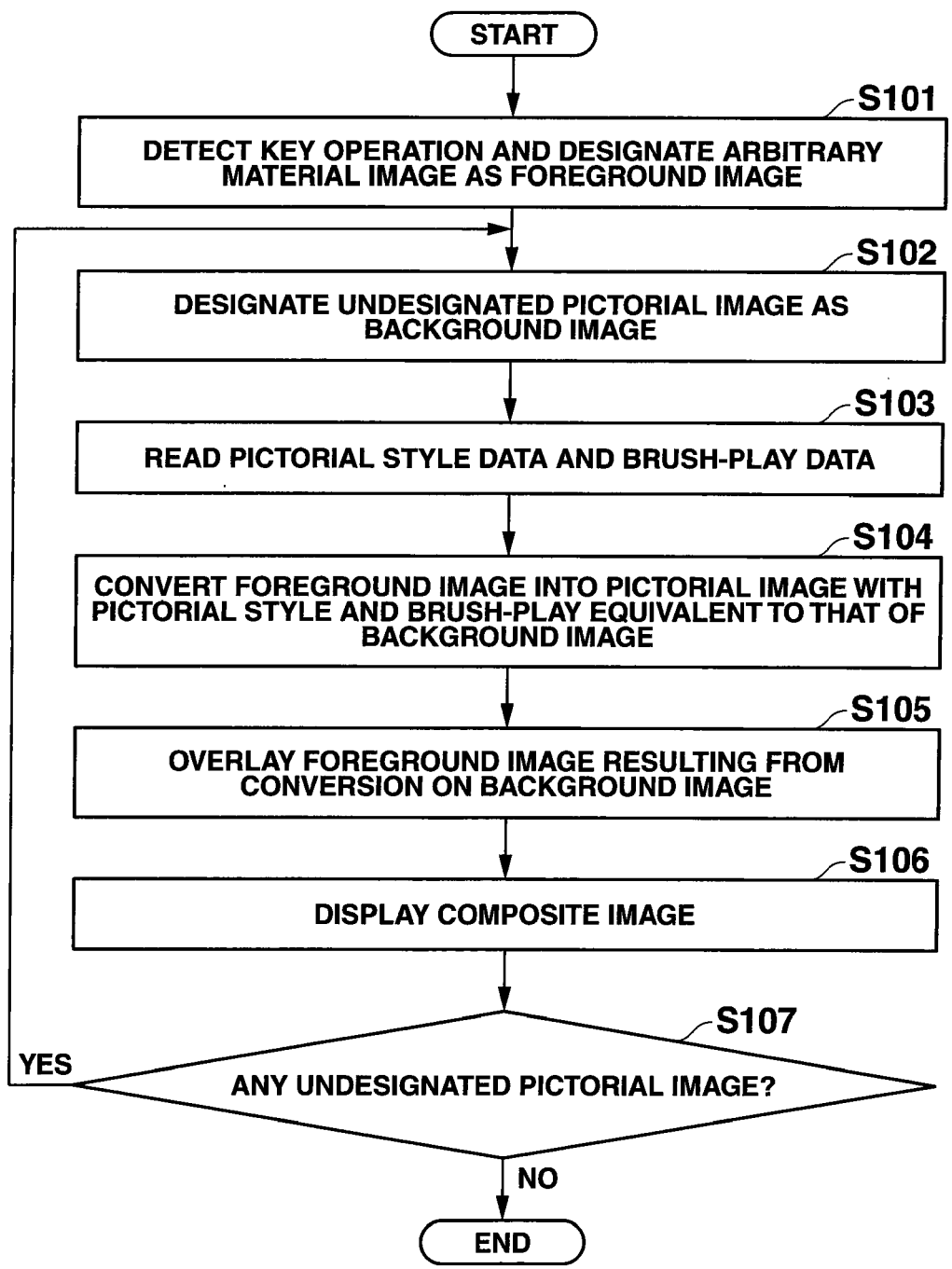
FIG. 7 is a flowchart illustrating a procedure for the CPU in the composite display mode according to the second embodiment.

Now, the specific operation of the DPF 501 according to the second embodiment in the composite display mode will be described. FIG. 7 is a flowchart illustrating a process executed by the control unit 10 in the composite display mode in accordance with the composition process program 102*a* stored in the ROM 102.

In the composite display mode, first, the image designation unit 11 sequentially detects the operation status of operation keys and the like in an operation key group 201 to designate an arbitrary image element as the foreground image (step S101).

In the processing in step S101, the image designation unit 11 reads image element data recorded in the recording medium 40. The image designation unit 11 then displays image elements expressed by the read image element data, in a list on a screen of the display unit 30 as selection candidates.

Then, the image designation unit 11 allows the user to select a desired image element via a predetermined key operation. The image designation unit 11 then stores the name of a file of the selected image element in the storage unit 16.

Subsequently, the image designation control unit 17 (CPU 101) allows the image designation unit 11 to designate a pictorial image not designated as the background image yet since the start of the processing in the composite display mode, as the background image (step S102). During the processing in step S102, the image designation unit 11 stores the name of a file of the pictorial image specified by the image designation control unit 17, in the storage unit 16.

During the processing in step S102, the image designation control unit 17 determines each one of the pictorial images recorded in the recording medium 40 as image data to be a processing target in a preset order (in order of the file name or the like). Then, the image designation unit 11 stores the name of the file of the pictorial image determined to be the processing target by the image designation control unit 17, in the storage unit 16. The names of the files of the pictorial images each stored in the storage unit 16 during every processing in step S102 are accumulated in order. Thus, the file names are used as information indicative of the pictorial images already designated as the background image.

Then, the information obtaining unit 12 reads pictorial style data and brush-play data added to image data of the pictorial image designated as the background image. The information obtaining unit 12 then supplies the pictorial style data and the brush-play data to the image conversion unit 13 (step S103). Then, the image conversion unit 13 converts the foreground image (image element) into a pictorial image with a pictorial style and brush-play equivalent to that of the background image (pictorial image) (step S104). Subsequently, the image composition unit 14 produces composite image data in which the foreground image corresponding to the pictorial image resulting from the conversion is overlaid on the background image (step S105). Thereafter, the display control unit 15 transmits the composite image data produced by the image composition unit 14 to the display unit 30. The display unit 30 displays a composite image in which, on a part of the background image (pictorial image), the foreground image (another pictorial image) with a pictorial style and brush-play equivalent to that of the foreground image is overlaid (step S106).

The specific nature of the processing in steps S103 to S106 executed by the information obtaining unit 12, the image conversion unit 13, the image composition unit 14, and the display control unit 15 is the same as that of the processing in steps S5 to S8 illustrated in FIG. 4 for the first embodiment.

Subsequently, in the second embodiment, the image designation control unit 17 determines whether or not any of the plurality of pictorial images recorded in the recording medium 40 as image data has been undesignated as the background image since the start of the processing in the composite display mode (step S107). The image designation control unit 17 executes the determination in the processing in step S107 by checking information indicative of the already designate pictorial images sequentially stored in the storage unit 16 during the processing in step S102.

While there remain pictorial images not designated as the background image yet (step S107: YES), the image designation control unit 17 allows the image designation unit 11 to designate the new pictorial images not designated as the background yet, as the background image in order (step S102). Moreover, the information obtaining unit 12, the image conversion unit 13, the image composition unit 14, and the display control unit 15 repeatedly execute the processing in step S103 to step S106.

The processing in step S103 to step S106 is repeated to allow the display unit 30 to display composite images changed as described below, in order. That is, the display unit 30 displays composite images in order in which only the background image is sequentially switched between different pictorial images, with a sole image element remaining designated as the foreground image. At the same time, in the composite images displayed on the display unit 30 in order, every time the background image is switched, the pictorial style and brush-play of the foreground image change to become equivalent to that of the new background image resulting from the switching.

Then, when the image designation control unit 17 determines that none of the plurality of pictorial images recorded in the recording medium as image data have been undesignated as the background image (step S107: NO), the control unit 10 ends the processing in the composite display mode.

In the second embodiment described above, plural types of composite images can be automatically displayed which use the same image element specified as the foreground by the user, with different pictorial images used as the background image. Furthermore, the image element used as the foreground image offers a pictorial style and brush-play equivalent to that of each of the pictorial images used as the background image. Thus, the present embodiment can provide plural types of composite images with only the background image varied which images are more natural and prevent the user from feeling the images odd.

Even in the configuration automatically displaying different composite images with only the background image switched among different pictorial images as in the case of the second embodiment, the foreground image may be provided with exclusively the same pictorial style as that of the pictorial image corresponding to the background image.

Furthermore, in the second embodiment, the image designation control unit 17 allows the image designation unit 11 to designate only the pictorial images recorded in the recording medium 40 as image data, as the background image in order. However, in the practice of the present invention, the image designation control unit 17 may allow the image designation unit 11 to designate each one of the pictorial images and the camera-taken images recorded in the recording medium 40 as image data, as the background image in order.

In the configuration in which the image designation control unit 17 allows the image designation unit 11 to designate each one of the pictorial images and the camera-taken images as the background image in order, the image conversion unit 13 may convert the foreground image into a pictorial image with a pictorial style and brush-play equivalent to that of the background image exclusively when a pictorial image is designated as the background image.

(Third Embodiment)

Now, a third embodiment of the present invention will be described. The third embodiment relates to another DPF having the same configuration as the DPF 1 illustrated in FIG. 1 and the same functions illustrated in FIG. 6 as the DPF 501 according to the second embodiment.

In the third embodiment, in a composite display mode described below, an image designation unit 11 designates an arbitrary image element stored in a recording medium 40 as image data, as a background image in response to the user's instruction. Furthermore, in the composite display mode described below, the image designation unit 11 designates, as a foreground image, one of a plurality of image elements stored in the recording medium 40 as image data which image element is specified by an image designation unit 17.

In the composite display mode described below, the image designation control unit 17 allows the image designation unit 11 to designate each one of the plurality of image elements stored in the recording medium 40 as image data, as the foreground image in order, with a sole pictorial image remaining designated as the background image.

Now, the specific operation of the DPF according to the third embodiment in the composite display mode will be described. FIG. 8 is a flowchart illustrating a process executed by a control unit 10 in the composite display mode in accordance with a composition process program 102*a* stored in the ROM 102.

In the composite display mode, first, the image designation unit 11 sequentially detects the operation status of operation keys and the like in an operation key group 201 to designate an arbitrary pictorial image as the background image (step S201).

In the processing in step S201, the image designation unit 11 reads a plurality of pictorial image data recorded in the recording medium 40. The image designation unit 11 then displays pictorial images expressed by the read pictorial image data, in a list on a screen of the display unit 30 as selection candidates. Then, the image designation unit 11 allows the user to select a desired image element via a predetermined key operation. The image designation unit 11 then stores the name of a file of the selected pictorial image in the storage unit 16.

Subsequently, the image designation control unit 17 allows the image designation unit 11 to designate an image element not designated as the foreground image yet since the start of the processing in the composite display mode, as the foreground image (step S202). During the processing in step S202, the image designation unit 11 stores the name of a file of the image element specified by the image designation control unit 17, in the storage unit 16.

During the processing in step S202, the image designation control unit 17 determines each one of the image elements recorded in the recording medium 40 as image data to be a processing target in a preset order (in order of the file name or the like). Then, the image designation unit 11 stores the name of the file of the image element determined to be the processing target by the image designation control unit 17, in the storage unit 16. The names of the files of the image elements each stored in the storage unit 16 during every processing in step S202 are accumulated in order. Thus, the file names are used as information indicative of the image elements already designated as the foreground image.

Then, an information obtaining unit 12 reads pictorial style data and brush-play data added to image data of the pictorial image designated as the background image. The information obtaining unit 12 then supplies the pictorial style data and the brush-play data to an image conversion unit 13 (step S203). Then, the image conversion unit 13 converts the foreground image (image element) into a pictorial image with a pictorial style and brush-play equivalent to that of the background image (pictorial image) (step S204). Subsequently, an image composition unit 14 produces composite image data in which the foreground image corresponding to the pictorial image resulting from the conversion is overlaid on the background image (step S205). Thereafter, a display control unit 15 transmits the composite image data produced by the image composition unit 14 to a display unit 30. The display unit 30 displays a composite image in which, on a part of the background image (pictorial image), the foreground image (another pictorial image) with a pictorial style and brush-play equivalent to that of the foreground image is overlaid (step S206).

The specific nature of the processing in steps S203 to S206 executed by the information obtaining unit 12, the image conversion unit 13, the image composition unit 14, and the display control unit 15 is the same as that of the processing in steps S5 to S8 illustrated in FIG. 4 for the first embodiment.

Subsequently, in the third embodiment, the image designation control unit 17 determines whether or not any of the plurality of image elements recorded in the recording medium 40 as image data has been undesignated as the background image since the start of the processing in the composite display mode (step S207). The image designation control unit 17 executes the determination in the processing in step S207 by checking information indicative of the already designated image elements sequentially stored in the storage unit 16 during the processing in step S202.

While there remain pictorial images not designated as the foreground image yet (step S207: YES), the image designation control unit 17 allows the image designation unit 11 to designate the new image elements not designated as the foreground yet, as the foreground image in order (step S202). Moreover, the information obtaining unit 12, the image conversion unit 13, the image composition unit 14, and the display control unit 15 repeatedly execute the processing in step S203 to step S206.

The processing in step S203 to step S206 is repeated to allow the display unit 30 to display composite images changed as described below, in order. That is, the display unit 30 displays composite images in order in which only the foreground image is sequentially switched between different image elements, with the background image remaining the same pictorial image. At the same time, in the composite images displayed on the display unit 30 in order, every time the background image is switched, all new foreground images corresponding to the sequentially switched image elements are provided with the same pictorial style and brush-play as that of the background image.

Then, when the image designation control unit 17 determines that none of the plurality of image elements recorded in the recording medium 40 as image data have been undesignated as the background image (step S207: NO), the control unit 10 ends the processing in the composite display mode.

During the second and subsequent processing in steps S203 to step S206 after the start of the processing in the composite display mode, the processing in step S203 executed by the information obtaining unit 12 may be omitted. If the processing in step S203 is omitted, then in the processing in step S204, the image conversion unit 13 may execute an art conversion process using parameters equivalent to those used for the first processing.

In the third embodiment described above, plural types of composite images can be automatically displayed which use the same pictorial image specified as the background by the user, with different image elements used as the foreground image. Furthermore, each one of the image elements used as the foreground image offers a pictorial style and brush-play equivalent to that of the pictorial image used as the background image. Thus, the present embodiment can provide plural types of composite images with only the foreground image varied which images are more natural and prevent the user from feeling the images odd.

Even in the configuration automatically displaying different composite images with only the foreground image switched among different image elements as in the case of the third embodiment, each one of the foreground images may be provided with exclusively the same pictorial style as that of the pictorial image corresponding to the background image.

(Modifications and the Like of the First Embodiment to the Third Embodiment)

Here, modifications of the first embodiment, the second embodiment, and the third embodiment (these embodiments are hereinafter collectively referred to as the present embodiment) will be described. In the description of the present embodiment, pictorial style data and brush-play data are stored in the file header area of a still image file; the pictorial style data is indicative of the pictorial style of each pictorial image stored in the recording medium 40 as image data, and the brush-play data is indicative of the nature of brush-play expressed in the pictorial image. However, the pictorial style data and the brush-play data may be stored in the recording medium 40 separately from the pictorial image data, provided that the correspondence relationship between the pictorial image data and both the pictorial style data and the brush-play data can be determined.

Furthermore, in the description of the present embodiment, the art conversion process executed by the image conversion unit 13 involves collecting strongly correlated ones of the pixels forming the image data based on colors or the like, grouping the collected pixels, and for the pixels in each group, replacing the colors of the pixels in the same group with the representative color for the group. However, the specific technique for the art conversion process executed by the image conversion unit 13 may be appropriately changed.

Additionally, in the description of the present embodiment, the present invention is adopted for the DPF. The present invention is applicable to apparatuses other than the DPF, provided that the apparatus has an image composition function to overlay, on a part of an image corresponding to the background, another image corresponding to the foreground. Another apparatuses to which the present invention is applicable include, for example, a digital camera, any mobile information terminal such as a mobile phone terminal which contains a digital camera, and a general-purpose personal computer.

In addition, mainly the configuration has been described in which a part of an image corresponding to the background and another image corresponding to the foreground are compositely displayed. However, in the present invention, the output form of composite images is not limited to display. Thus, the present invention is applicable to other apparatuses such as a printer which do not have a function to display composite images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image composition apparatus configured to produce a composite image in which a foreground image is overlaid on a part of a background image, the apparatus comprising:
    an image designation unit configured to designate a pair of images used as the background image and the foreground image;
    an information obtaining unit configured to, when one image of the pair of images is a pictorial image with a certain pictorial style, obtain pictorial style information indicative of the pictorial style of the one image of the pair of images;

an image conversion unit configured to convert the other image of the pair of images into a pictorial image with the pictorial style indicated by the pictorial style information obtained by the information obtaining unit;

a composition unit configured to produce a composite image from a combination of the pictorial image corresponding to the one image of the pair of images and the pictorial image resulting from the conversion by the image conversion unit of the other image of the pair of images; and an output unit configured to output the composite image produced by the composition unit.

2. The apparatus according to claim 1, wherein the information obtaining unit obtains, together with the pictorial style information, brush-play information indicative of a nature of brush-play expressed in the pictorial image corresponding to the one image of the pair of images, and the image conversion unit converts the other image of the pair of images into a pictorial image with the pictorial style indicated by the pictorial style information obtained by the information obtaining unit and with brush-play expressed therein, the brush-play being indicated by the brush-play information obtained by the information obtaining unit.

3. The apparatus according to claim 1, further comprising an image designation control unit configured to allow the image designation unit to designate each one of a plurality of pictorial images each with a certain pictorial style as the background image in order, with a sole image remaining designated as the background image, wherein every time the image designation control unit allows the image designation unit to designate a new pictorial image as the background image, the information obtaining unit obtains the pictorial style information indicative of the pictorial style of the new pictorial image, the image conversion unit converts the sole image into a pictorial image with the pictorial style indicated by the pictorial style information obtained by the information obtaining unit, the composition unit produces a composite image from a combination of the new pictorial image and the pictorial image resulting from the conversion by the image conversion unit of the sole image, and the output unit outputs the composite image produced by the composition unit.

4. The apparatus according to claim 1, further comprising an image designation control unit configured to allow the image designation unit to designate each one of a plurality of images as the foreground image in order, with a sole pictorial image with a certain pictorial style remaining designated as the background image, wherein the information obtaining unit obtains pictorial style information indicative of the pictorial style of the sole pictorial image that the image designation control unit allows the image designation unit to designate as the background image, and every time the image designation control unit allows the image designation unit to designate a new pictorial image as the foreground image, the image conversion unit converts the new pictorial image into a pictorial image with the pictorial style indicated by the pictorial style information obtained by the information obtaining unit, the composition unit produces a composite image from a combination of the sole pictorial image and the pictorial image resulting from the conversion by the image conversion unit of the new pictorial image, and the output unit outputs the composite image produced by the composition unit.

5. A non-transitory computer-readable storage medium having program code stored thereon for controlling an image composition apparatus configured to produce a composite image in which a foreground image is overlaid on a part of a background image, the program code comprising:

designating a pair of images used as the background image and the foreground image;

obtaining, when one image of the pair of images is a pictorial image with a certain pictorial style, pictorial style information indicative of the pictorial style of the one image of the pair of images;

converting the other image of the pair of images into a pictorial image with the pictorial style indicated by the pictorial style information; and producing a composite image from a combination of the pictorial image corresponding to the one image of the pair of images and the pictorial image resulting from the conversion of the other image of the pair of images.

* * * * *